United States Patent Office 3,705,925
Patented Dec. 12, 1972

3,705,925
METHOD FOR SEPARATION OF FATTY ALCOHOLS FROM HYDROCARBONS
Charles M. Starks and Gifford G. McClaflin, Ponca City, Okla., assignors to Continental Oil Company, Ponca City, Okla.
Filed Mar. 19, 1969, Ser. No. 808,486
Int. Cl. C07c 29/24, 7/00
U.S. Cl. 260—643 D                    5 Claims

ABSTRACT OF THE DISCLOSURE

Fluorocarbons are disclosed as selective solvents for separating alcohols from hydrocarbons.

---

This invention is in the field of separation of alcohols from hydrocarbons.

It has been known for some time that aluminum alkyls such as aluminum triethyl or aluminum diethyl hydride or other aluminum alkyls can be reacted with olefins, generally ethylene, to produce aluminum alkyls having alkyl substituents of a greater number of carbon atoms than the original alkyl substituents. The aluminum alkyls can be oxidized and hydrolyzed to produce alcohols in the plasticizer or detergent range. The growth and oxidation reactions are generally carried out in the presence of a hydrocarbon solvent. It is also known that during the growth reaction some olefins are produced. In many cases, it is desirable to oxidize the aluminum alkyl growth product to the aluminum alkoxide in the presence of the solvent and olefins produced during the reaction. It is also known that many of the alcohols boil at substantially the same temperature as do the impurities. Similarly, alcohols produced by the oxo-process will often be contaminated with hydrocarbon impurities, particularly olefins.

According to this invention, hydrocarbons are separated from alcohols by selective extraction with fluorocarbons.

This invention is especially useful in cases where the boiling points of the alcohol and hydrocarbons are the same or nearly so and therefore cannot be separated by distillation.

The alcohols may be primary, secondary or tertiary. They may be straight chain or branched. They may be diols or triols and may even contain an aromatic ring in the molecule.

Figure 1:
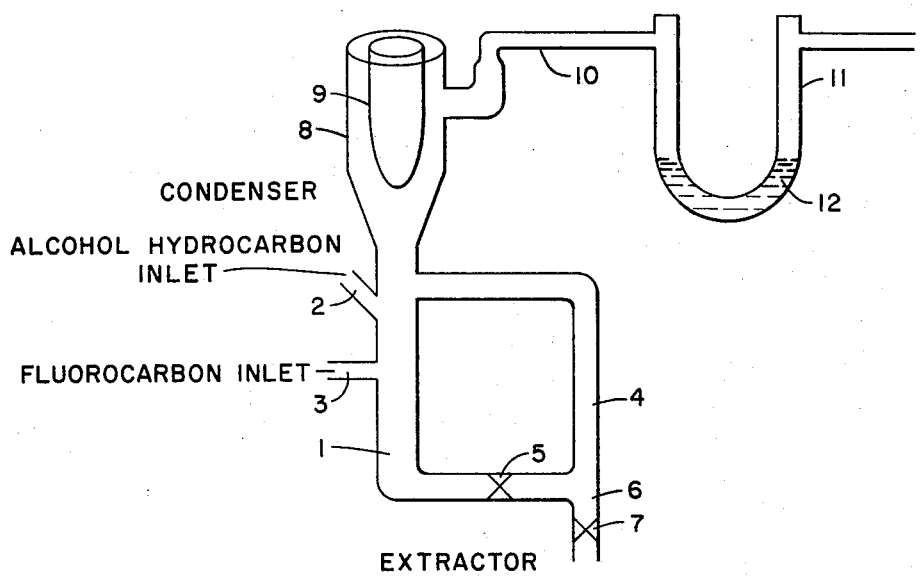
FIG. 1 is a schematic showing of a suitable batch type apparatus for carrying out the process of this invention.

As has been indicated, this invention is directed to separation of various hydrocarbons from alcohols. The invention will be described in conjunction with the separation of $C_6$ to $C_{22}+$ alcohols from solvent and/or olefins produced in the production of the alcohols by aluminum chemistry, however, the process is applicable for separating such high molecular weight alcohols generally, e.g., natural fatty alcohols as well as synthetic alcohols.

The hydrocarbons which are to be separated from the alcohol can be straight chain, branched chain, cyclic, aromatic, substituted aromatic and can be saturated or unsaturated. The hydrocarbon will generally contain 1 to 30 carbon atoms; however, this is not critical. The only limitation is that the hydrocarbon be liquid at the boiling point of the fluorocarbon utilized, i.e., the fluorocarbon has a lower boiling point than that of the hydrocarbon. Thus, if methylfluoride were utilized as the fluorocarbon the $C_{30}$ material would crystallize out. In this latter case, one would choose a high boiling fluorocarbon such as perfluoroheptane.

Typical alcohols include hexanol-1, hexanol-3, tertiary octanol, 1,3-dihydric heptanol, dodecanol-1, docosanol-1, 5-octa-decanol, 3-ethyl,6-butyl-dodecanol-1, and the like, however, the separation will generally be the separation of close boiling aliphatic, straight chain saturated monohydric alcohols, preferably a 1-ol from a close boiling solvent. As is apparent from the above, these are unsubstituted. Typical separations include pentanol-3 from 2,3-dimethylhexane, pentanol-3 from 2,me-3-et-pentane, 2-me-pentanol-2 from 2-methylheptene-2, 3-me-pentanol-2 from 2,6-di-me-heptane, n-octanol from n-undecane, nonanol-2 from n-undecane, nonanol-3 from n-undecane, nonanol-5 from n-undecane, glycol from n-undecane, benzyl alcohol from dodecane, and glycerol from hexadecane mixtures. As will be recognized by those skilled in the art, each of the foregoing pairs boil at essentially the same temperature.

In choosing the fluorocarbon, one must keep in mind the boiling point of the fluorocarbon and the crystallization temperature of the hydrocarbon and alcohol being separated. It is necessary that the components be liquid during the extraction. It is preferred to use the perfluorocarbons, e.g., all hydrogens replaced by fluorine; however, with the hydrocarbons of 1 to 3 carbon atoms a single fluorine is operable. As the hydrocarbon becomes larger, then more hydrogens will have to be substituted, e.g., about 25 percent or more is preferred. The fluorocarbon may also contain other nonreactive substituents, particularly other halides. The perfluorocarbons particularly preferred are perfluorocarbons having 4 to 20 carbon atoms and more preferably are aliphatic perfluorocarbons of 4 to 10 carbon atoms. The ratio of fluorocarbon to hydrocarbon can vary over a wide range; however, for best results we prefer to use 1.5 to 3 volumes of the fluorocarbon per volume of alcohol-hydrocarbon mixture.

Examples of the preferred fluorocarbons include: perfluoro methane, perfluoro ethane, perfluoro propane, perfluoro-n-butane, perfluoro-isobutane, perfluoro pentane, perfluoro hexane, perfluoro-2,2,3-trimethyl butane, perfluoro hexadecane, perfluoro cyclobutane, perfluoro cyclobutene, perfluoro cyclopentane, perfluoro cyclohexane, perfluoro methyl cyclohexane, perfluoro dimethyl cyclohexane, perfluoro-1,3,5-trimethylcyclohexane, perfluoro benzene, perfluoro toluene, perfluoroeisocosane and the like.

Examples of other operable fluorocarbons include: methylfluoride, methylenefluoride, fluoroform, monochloromonofluoro-methane, mono-bromo-difluoro-methane, mono-chlorotrifluoro-methane, ethylfluoride, 1,2-difluoro-ethane, mono-bromo-monofluoroethane, 2-monochloro-1, difluoroethane, difluoro-dichloro-ethane, tetrafluoro-dichloroethane, 1,1,1-trifluoroethane, 1,2-difluoro-propane, 1,3-difluoropropane, 1,2,3-trifluoropropane, allylfluoride, di-iodo-mono-fluoromethane, mono-chloro-mono-bromofluoromethane, tetrachloro-di-fluoro-ethane, n-propylfluoride, isopropylfluoride, n-amylfluoride, n-hexylfluoride, mono-fluorobenzol, meta-di-fluorobenzyl, 1,2,4-trifluorobenzol, p-fluoro-bromo-benzol, o-fluorotoluol, p-fluorotoluol, trifluorotoluol, monofluoro-cyclohexane, di-fluoronaphthalene and the like. Thus, it can be seen that compounds containing only carbon, hydrogen and halogens wherein at least 25% of the hydrogens are replaced with fluorine are operable.

Referring to FIG. 1, the alcohol hydrocarbon mix to be separated is introduced to chamber 1 via valve 2. The fluorocarbon is introduced into chamber 1 via valve 3. Chamber 4 is open to chamber 1 at the top and is separated from chamber 1 via valve 5 at the bottom. Product withdrawal conduit 6 is equipped with valve 7. Condenser 8 is opened to left chamber 1 and is equipped with a hollow chamber 9. The condenser 8 is opened to bubbler 11 via conduit 10. The bubbler 11 contains a liquid seal 12.

Figure 2:
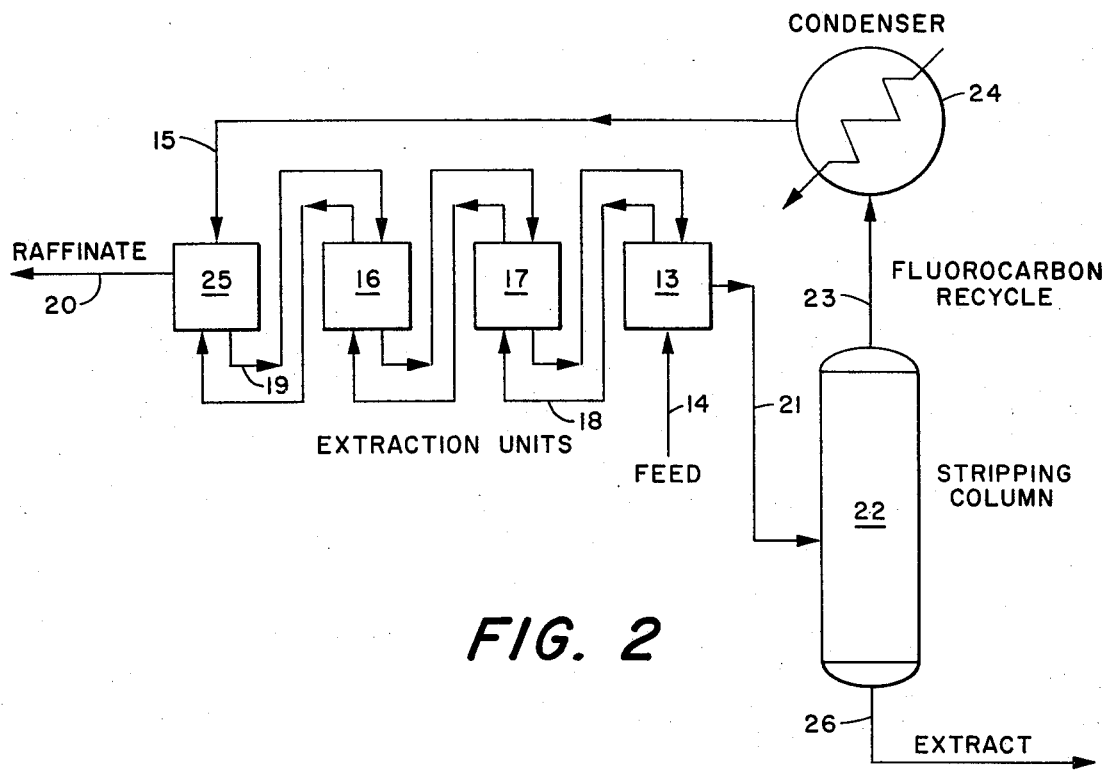
FIG. 2 is a schematic flow diagram of a suitable continuous apparatus for carrying out the process of this invention.

As will be obvious from the example hereinafter, some separations are more difficult than others. For this reason the number of separation steps required will vary depending upon the separation and the particular fluorocarbon. FIG. 2 illustrates a continuous separation incorporating a plurality of stages. The mixture of the alcohol and hydrocarbon is fed into the bottom of the last stage 13 via conduit 14 while the fluorocarbon is added to the top of stage one (25) via conduit 15. The hydrocarbon from stage 13 is passed via conduit 18 to the preceding contacting stage 17 and the fluorocarbon with extracted hydrocarbon passes via conduit 19 to the next stage 16. Thus a continuous counter-current contacting series is established for the total desired contacting steps. The alcohol compound of desired purity then is recovered via conduit 20. The fluorocarbon enriched in hydrocarbon passes via conduit 21 to stripping column 22 where the fluorocarbon evaporates and passes via conduit 23 to condenser 24 where it is condensed and passed back to the first contacting column or stage 25. The hydrocarbon is removed from column 22 via conduit 26. Additional condensers (not shown) are placed between the contacting chambers on the fluorocarbon flow as needed.

In both of the above descriptions, it is assumed that the fluorocarbon is more dense than is the hydrocarbon. The system can obviously be inverted when a light fluorocarbon is utilized.

In the following example, perfluorobutane is utilized as the selective solvent in order that a comparison of ease of separation can be shown. For example, n-octyl-1-ol separaton from undecane is comparatively difficult. As the alcohol concentration increases, the more difficult the separation. Thus, by the time the last extraction stage is reached, e.g., the first stage as described, the amount of alcohol has reached the minimum percentage and the separation is relatively great. The system shown in FIG. 2 then yields a substantially pure hydrocarbon if sufficient stages are employed. If it is desired to obtain a substantially pure alcohol, then the feed flow would be reversed, e.g., the feed into chamber 25 and the hydrocarbon to alcohol ratio will be decreasing as the two streams reach chamber 13.

The following example was run in equipment substantially as shown in FIG. 1. This shows only one extraction step.

EXAMPLE

Charge 11 ml. perfluorobutane
1.53 grams (2 ml.) n-octyl alcohol-undecane mixture (51.27% n-octyl alcohol 48.73% undecane).

Procedure

Charge was added to extractor. Two distinct layers developed. The alcohol and hydrocarbon made up the top layer, and the fluorocarbon occupied the lower layer. The stopcock separating the left and right chambers of the extractor was opened and a portion of the perfluorobutane emptied into the right chamber until layer level equilibrium was reached. The perfluorobutane was allowed to boil off from the right chamber and was recondensed in the left chamber. This afforded a continuous extraction system. This extraction was continued for 0.5 hour. The stopcock joining the two chambers was shut off and the perfluorobutane was allowed to boil off from both chambers. This left 0.5 ml. (0.40 g.) of extract in the right chamber. The left chamber contained the remainder of the charge. These two fractions were analyzed by GLPC and compared to the starting material. The results are shown below:

|  | Percent n-octanol | Percent undecane |
|---|---|---|
| n-Octanol-undecane charge material | 51.27 | 48.73 |
| Right chamber product (extract) | 2.19 | 97.81 |
| Left chamber product (residue) | 67.80 | 32.20 |

NOTE.—Boiling point of n-octyl alcohol, 194.5; boiling point of n-undecane, 194.5.

Having described the invention we claim:

1. A process of enriching the alcohol content of a solution containing an unsubstituted aliphatic straight chain saturated monohydric alcohol of 6 to 22 carbon atoms and a hydrocarbon of 1 to 30 carbon atoms comprising:
   (a) contacting the solution of alcohol and hydrocarbon with a $C_4$–$C_{20}$ perfluorocarbon in a liquid-liquid extraction system, said perfluorocarbon having a boiling point lower than the boiling point of the hydrocarbon; and
   (b) allowing the liquids to separate into two phases, one an alcohol-enriched phase and the other a hydrocarbon-enriched phase.

2. A process according to claim 1 wherein the volume ratio of said perfluorocarbon to alcohol-hydrocarbon solution is at least 1.5:1, said alcohol being a mono-1-ol containing 8–22 carbon atoms.

3. A process according to claim 1 wherein the perfluorocarbon is perfluorobutane.

4. A process according to claim 1 wherein the solution contains a mixture of alcohols.

5. A process of enriching the alcohol content of a solution containing an unsubstituted aliphatic straight chain saturated monohydric alcohol of 6 to 22 carbon atoms and a hydrocarbon of 1 to 30 carbon atoms comprising:
   (a) establishing a plurality of extraction zones in series;
   (b) introducing said alcohol-hydrocarbon solution in a liquid state at one end of the series and a fluorine-substituted hydrocarbon in a liquid state at the other end of the series, said fluorine-substituted hydrocarbon having a boiling point lower than the boiling point of the hydrocarbon and being defined as
      (1) a $C_1$–$C_3$ hydrocarbon substituted by at least one fluorine atom with any nonfluorine substitution being other halogen atoms or
      (2) a $C_4$–$C_{20}$ perfluorocarbon;
   (c) flowing the alcohol-containing liquid and said fluorine-substituted hydrocarbon liquid countercurrently through said series of extraction zones and, in each extraction zone,
      (1) contacting the alcohol-containing liquid with the fluorine-substituted hydrocarbon liquid to to form a liquid-liquid extraction system,
      (2) allowing said extraction system to separate into an alcohol-enriched phase and a hydrocarbon/fluorine-substituted hydrocarbon phase,
      (3) separating the phases and continuing their respective flows through the process;
   (d) withdrawing a hydrocarbon/fluorine-substituted hydrocarbon phase from said one end of the series of extraction zones and an alcohol-enriched phase from said other end;
   (e) and stripping the fluorine-substituted hydrocarbon from the withdrawn hydrocarbon/fluorine - substituted hydrocarbon phase of step (d) and recycling it back to step (b).

References Cited
UNITED STATES PATENTS

| | | | |
|---|---|---|---|
| 2,140,485 | 12/1938 | Terres et al. | 208—336 |
| 2,162,682 | 6/1939 | Terres et al. | 208—336 |
| 2,510,806 | 6/1950 | Egberts et al. | 260—705 |
| 2,582,197 | 1/1952 | Egan | 260—676 |
| 2,614,965 | 10/1952 | Ruehlen | 260—676 |
| 2,885,446 | 5/1959 | Sharp et al. | 260—639 B |
| 2,952,717 | 7/1960 | Fleck et al. | 260—676 |
| 3,305,592 | 2/1967 | Acciarri et al. | 260—643 D |

OTHER REFERENCES

Vogel: "Practical Organic Chemistry," 3rd ed. (1957), pp. 44, 45, 149, 150.

Hudlicky: "Chemistry of Organic Fluorine Compounds" (1962), pp. 340, 399.

Freon: "Technical Bulletin" (1964), pp. 1 to 12.

LEON ZITVER, Primary Examiner

J. E. EVANS, Assistant Examiner

U.S. Cl. X.R.

260—618 A, 637 A, 637 R, 676 R